United States Patent [19]
Phathayakorn et al.

[11] Patent Number: 6,078,324
[45] Date of Patent: *Jun. 20, 2000

[54] EVENT SIGNALING IN A FOLDABLE OBJECT TREE

[75] Inventors: Prayoon Phathayakorn, San Jose; Her-Daw Che, Cupertino; Kong Li, San Jose; Ching-Fa Hwang, Cupertino; Thomas Richard Kemp, Menlo Park, all of Calif.

[73] Assignee: NetIQ Corporation, Santa Clara, Calif.

[*] Notice: This patent is subject to a terminal disclaimer.

[21] Appl. No.: 09/081,850

[22] Filed: May 19, 1998

Related U.S. Application Data

[63] Continuation of application No. 08/784,563, Jan. 17, 1997.
[51] Int. Cl.[7] .................................................. G06F 3/14
[52] U.S. Cl. ........................................ 345/348; 345/356
[58] Field of Search ................................. 345/348, 349, 345/356, 339, 335, 326, 357

[56] References Cited

U.S. PATENT DOCUMENTS

| | | | |
|---|---|---|---|
| 5,140,677 | 8/1992 | Fleming et al. | 345/348 |
| 5,276,789 | 1/1994 | Besaw et al. | 345/356 X |
| 5,295,244 | 3/1994 | Dev et al. | 345/357 |
| 5,416,901 | 5/1995 | Torres | 345/348 |
| 5,422,993 | 6/1995 | Fleming et al. | 345/348 |
| 5,432,903 | 7/1995 | Frid-Nielsen | 345/349 |
| 5,471,619 | 11/1995 | Messina | 345/348 X |
| 5,491,783 | 2/1996 | Douglas et al. | 345/335 |
| 5,491,795 | 2/1996 | Beaudet et al. | 345/346 |
| 5,557,730 | 9/1996 | Frid-Nielsen | 345/349 |
| 5,638,504 | 6/1997 | Scott et al. | 707/530 |
| 5,638,505 | 6/1997 | Hemenway et al. | 345/348 |
| 5,644,334 | 7/1997 | Jones et al. | 345/419 |
| 5,689,664 | 11/1997 | Narayanan et al. | 345/340 |
| 5,701,137 | 12/1997 | Kiernan et al. | 345/340 |
| 5,764,913 | 6/1998 | Jancke et al. | 709/224 |

OTHER PUBLICATIONS

Microsoft Mail User's Guide, version 3.0, Microsoft Corporation, pp. 1,2,23 (1992).

*Primary Examiner*—Crescelle N. dela Torre
*Attorney, Agent, or Firm*—Skjerven, Morrill,MacPherson, Franklin and Friel; Fabio E. Marino

[57] ABSTRACT

A method is provided for signaling and acknowledging events associated with resource objects organized in a foldable object tree displayed by a GUI. When an event occurs on a resource object, an event indicator is placed not only on the resource object's icon in the object tree, but also on all the icons of the parent resource objects of that resource object to ensure that the event indicator is visible even when the object tree is folded. Events occurring on a resource object may be acknowledged by clicking on the resource object icon. When an event is acknowledged, the event indicator is removed not only from the resource object's icon but also from all of the icons of the parent resource objects for that resource object to ensure that the acknowledgment is always accurately reflected by the GUI display even the object tree is folded. The method further ensures that multiple events occurring on resource objects having a common parent resource object, are correctly reflected by visual indicators displayed by the GUI. A method is further provided for performing system management on a computer system. Finally, a method is provided for performing system management on a distributed system.

16 Claims, 19 Drawing Sheets

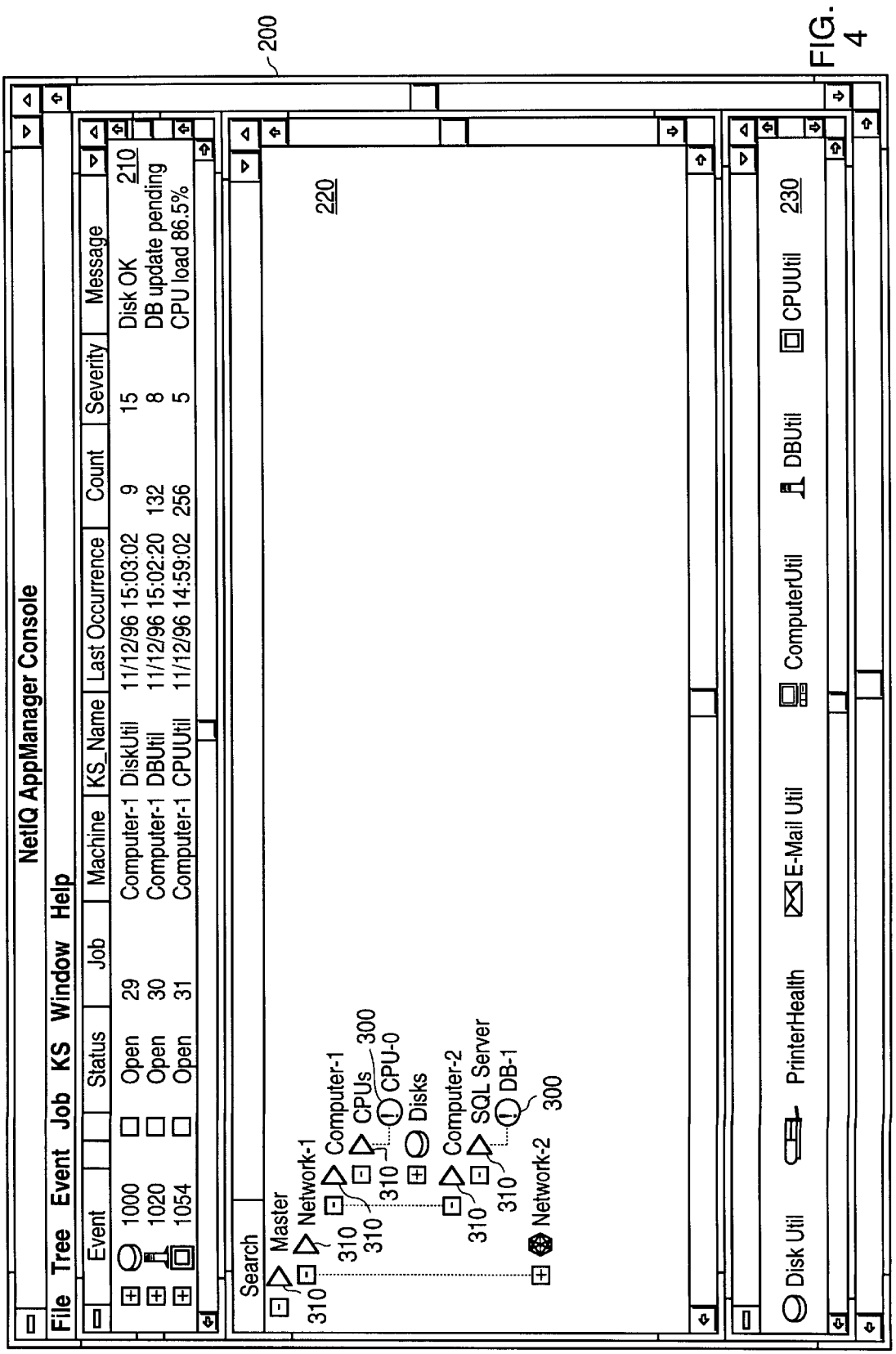

EVENT SIGNALING IN A FOLDABLE OBJECT TREE

CROSS-REFERENCE TO RELATED APPLICATIONS

This application is a continuation of application Ser. No. 08/784,563 entitled "Event Signaling In A Foldable Object Tree", filed on Jan. 17, 1997, which is incorporated herein by reference in its entirety.

This application is related to copending application Ser. No. 08/784,613, entitled "Selection, Type Matching And Manipulation Of Resource Objects By A Computer", filed on Jan. 17, 1997, which is incorporated herein by reference in its entirety.

BACKGROUND OF THE INVENTION

1. Field of the Invention

The present invention relates generally to the graphical user interface (GUI) portion of a computer system and, in particular, to a method of signaling and acknowledging the occurrence of events via a GUI.

2. Description of Related Art

FIG. 1A illustrates the GUI portion of a typical computer system. Computer 100 includes a monitor 110, a keyboard 120 and a mouse 130. One or more windows 140 may be displayed on screen 150 of monitor 110 to allow the user to perform different tasks concurrently. A cursor icon 160, generally, but not necessarily, resembling an arrow is also displayed on screen 150 and is controlled by mouse 130. Generally, when more than one window 140 is displayed on screen 150, the input from keyboard 120 is directed to the foreground window.

As modern computer systems encompass a variety of components, both at the hardware and at the software level, GUIs allow users to control the components of the computer system via an abstract representation of the computer system displayed by the GUI. For example, such a graphical representation of a computer system may be used to monitor events occurring on the various components of the computer system. FIG. 1B illustrates a window 170 displayed on screen 150 illustrating a computer system comprising a computer and two printers attached to the computer. A printer malfunction is indicated by displaying a printer unavailable icon 180 superimposed over dot matrix printer icon 190.

However, in modern computer system, and in particular in systems that have multiple servers and complex network configurations, the number of components that need to be graphically represented becomes quickly unmanageable. There is thus a need for an easy to implement method of signaling events occurring on components of large computer system via a GUI.

SUMMARY

The preferred embodiment of the invention provides a method for signaling and acknowledging events associated with resource objects organized in a foldable object tree displayed by a GUI. A foldable object tree allows a part of the tree to be folded into its parent object (i.e., the object at the node of the tree closest to the root). When an event occurs on a resource object, an event indicator is placed not only on the resource object's icon in the object tree, but also on all the icons of the parent resource objects of that resource object to ensure that the event indicator is visible even when the object tree is folded.

Events occurring on a resource object may be acknowledged by clicking on the resource object icon. In one embodiment of the invention, when an event is acknowledged, the event indicator is removed not only from the resource object's icon but also from all of the icons of the parent resource objects for that resource object to ensure that the acknowledgment is always accurately reflected by the GUI display even when the object tree is folded. The method further ensures that multiple events occurring on resource objects having a common parent resource object, are correctly reflected by visual indicators displayed by the GUI.

In one embodiment of the invention, a method is further provided for performing system management on a computer system.

Finally, in one embodiment of the invention, a method is provided for performing system management on a distributed system.

BRIEF DESCRIPTION OF THE DRAWINGS

FIG. 4 illustrates the tree of FIG. 3D during a temporary unfolding operation, according to one embodiment of the invention.

DESCRIPTION OF PREFERRED EMBODIMENTS

The preferred embodiment of the invention provides a method for signaling and acknowledging events associated with resource object represented by icons displayed by the GUI of a computer system. Each object may refer to a resource to be manipulated such as network, computer, application, directory, or file. Resource objects are organized in a foldable object tree. When an event occurs on a resource object, an event indicator is placed not only on the resource object's icon in the object tree, but also on all the icons of the parent resource objects of that resource object to ensure that the event indicator is visible even when the object tree is folded.

Events occurring on a resource object may be acknowledged by clicking on the resource object. When an event is acknowledged, the event indicator is removed not only from the resource object's icon but also from all of the icons of the parent resource objects for that resource object.

Relationships among resource objects can be described in terms of parent-child relationships. A single parent may have multiple children of the same generation. As used herein, the terms parent object and child object span over multiple generations (i.e., a parent object of a child object is also a parent object of a child object of the child object).

Figure 9A:
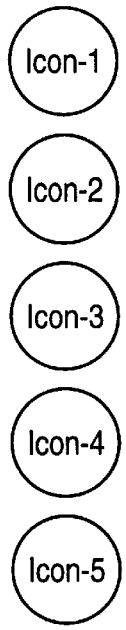
FIGS. 9A–9C show several resource object topologies, according to some embodiments of the invention.
Figure 9B:
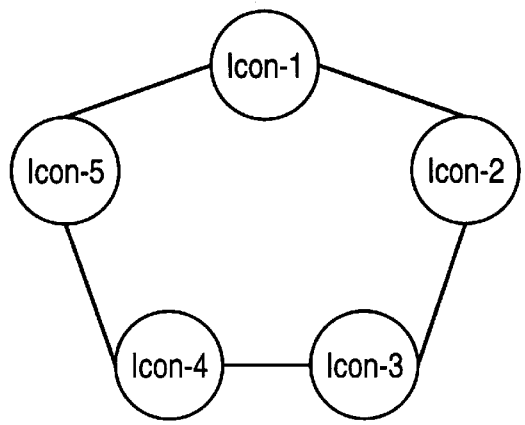
Figure 9C:
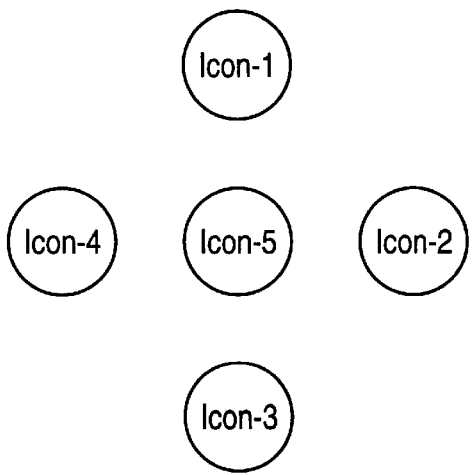

Parent-child relationships among resource objects are represented graphically by an object tree displayed on a screen of computer system. While other topologies, such as a star, a ring or a list (FIGS. 9A–9C) are also within the scope of the present invention, a foldable object tree is described herein as the topology of choice. Each resource object is represented in the tree by an icon, which can also be referred to as a node of the tree. A foldable object tree has several objects at many levels in a hierarchical, parent-child relationship. The tree consists of several resource object icons displayed in a grid having rows and columns. Only one object icon appears in each row. Parent object icons appear to the left and on top of child object icons and are connected to child object icons by vertical and horizontal lines. Each column in the tree represents a hierarchical level. A parent object icon may represent all child object icons at the next hierarchical level (i.e., all the icons in the column to the right of the parent's column). The foldable tree can be folded by clicking on a parent object icon, causing all child object icons of the parent object icon to be hidden from the tree and the empty space to be filled by shifting up the lower rows of the tree. Likewise, a folded tree can be unfolded by clicking on an icon at a node of the tree. If the resource object represented by the icon at the node has one or more children objects, the portion of the tree is redisplayed and rows below the unfolded node are shifted to accommodate the display of the new icons. These operations are illustrated in FIGS. 2A–2D.

Figure 1A:
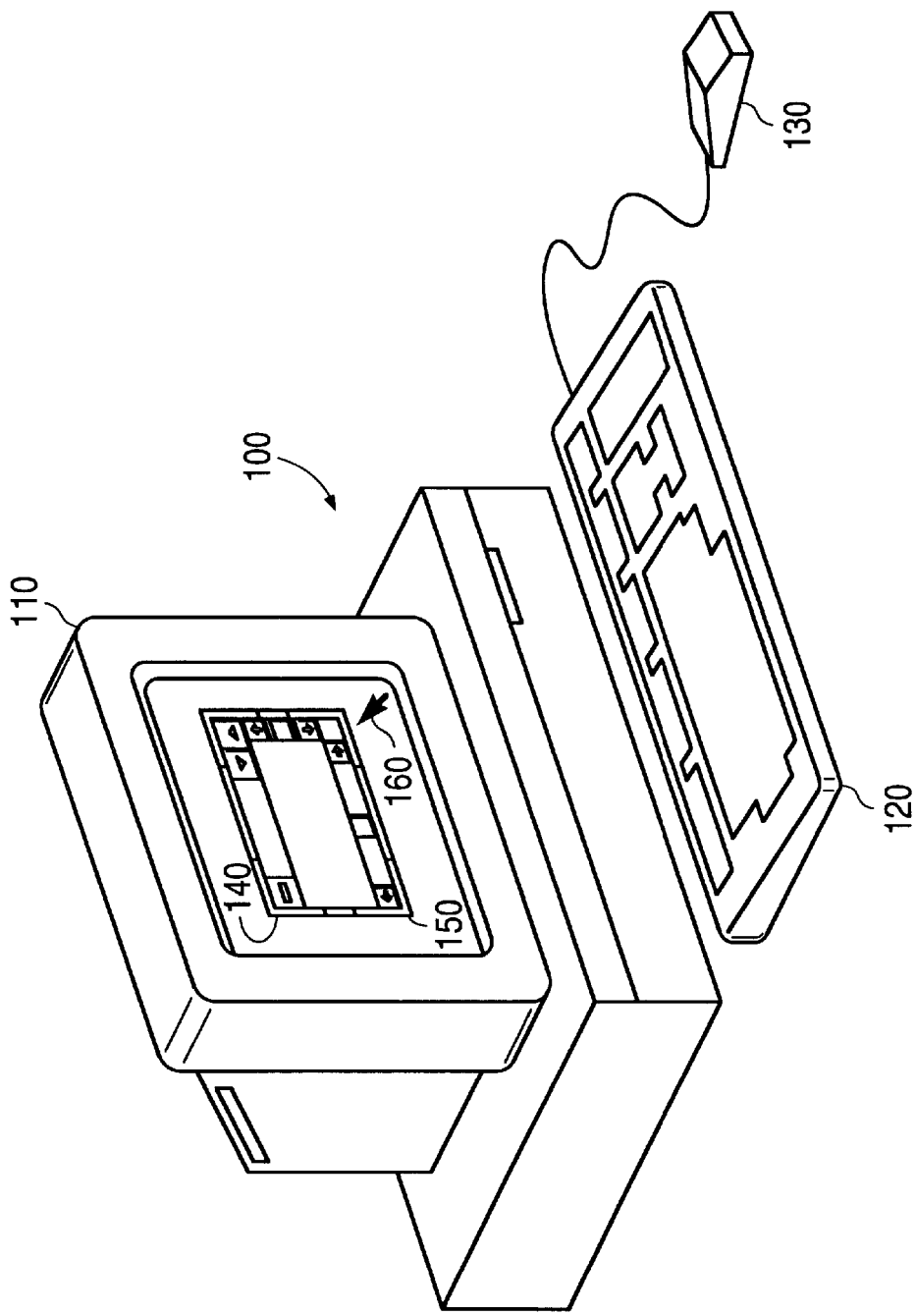
FIG. 1A illustrates the graphical user interface (GUI) portion of a prior art computer system.
Figure 1B:
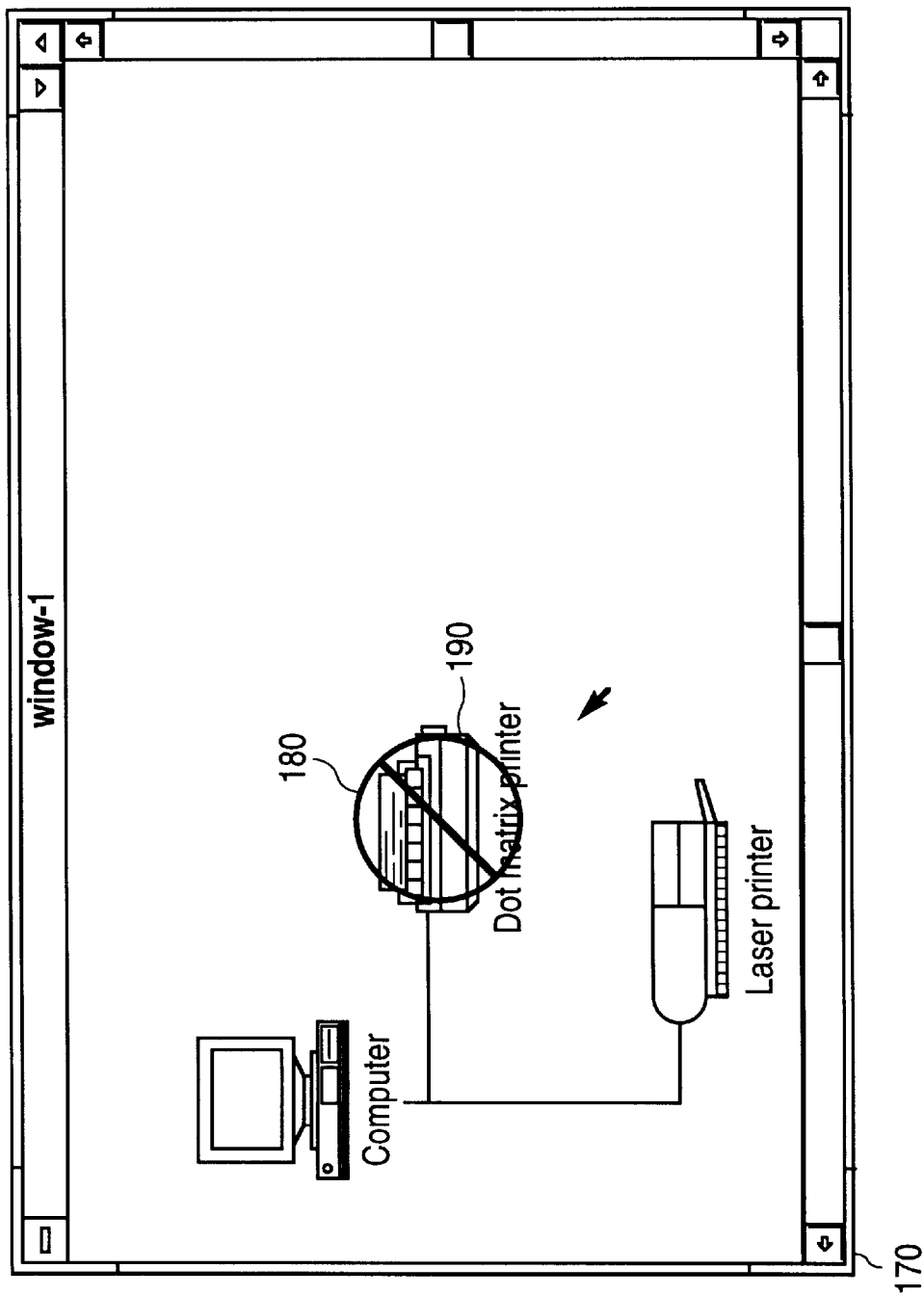
FIG. 1B illustrates a prior art method for signaling the occurrence of an event via a GUI.
Figure 2A:
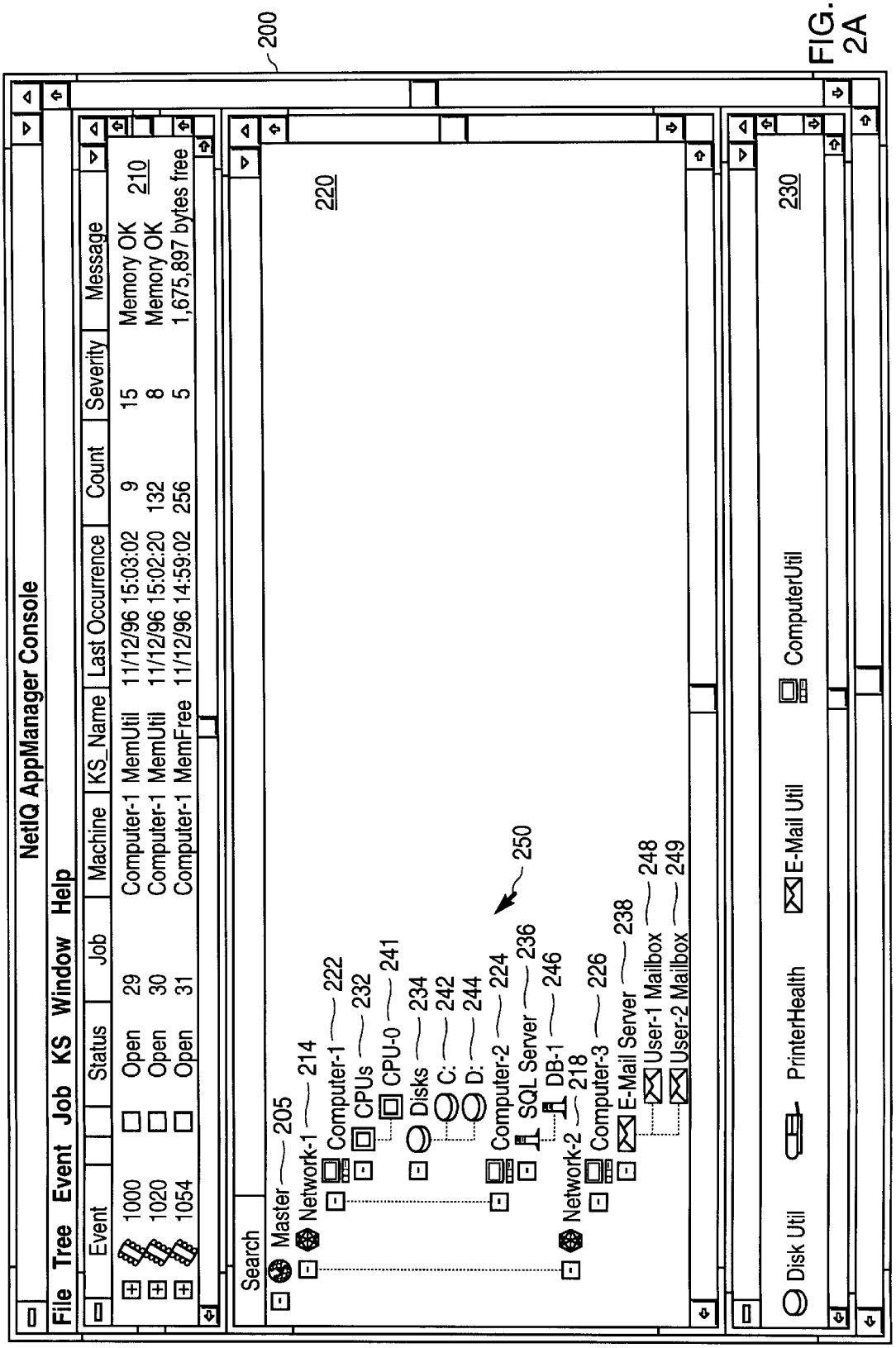
FIG. 2A shows foldable object tree displayed by the GUI of a computer system, according to one embodiment of the invention.

FIG. 2A shows a window 200 displayed on a screen of the computer system and divided into three panes: list pane 210, tree-view pane 220 and program pane 230. Tree-view pane 220 contains a foldable object tree whose icons represent resource objects of the computer system. Each icon in tree-view pane 220 represents a resource object. Master icon 205 represents the root of the tree (i.e., the node at the top of the tree). Master icon 205 has two child object icons, network-1 icon 214 and network-2 icon 218. Network-1 icon 214, in turn, has two child object icons, namely computer-1 icon 222 and computer-2 icon 224. Network-2 icon 218, on the other hand, has a single child icon (ire., computer-3 icon 226). Similarly, the child object icons of computer-1 icon 222 are CPUs icon 232 and disks icon 234, the child object icon of computer-2 icon 224 is SQL server icon 236 and the child object icon of computer-3 icon is email server icon 238. Finally, CPUs icon 232 has a single child object icon, CPU-0 icon 241, disks icon 234 has two child object icons, C: icon 242 and D: icon 244, SQL server icon 236 has a single child object icon, DB-1 icon 246 and e-mail server icon 238 has two child object icons, user-1 mailbox icon 248 and user-2 mailbox icon 249.

Figure 2B:
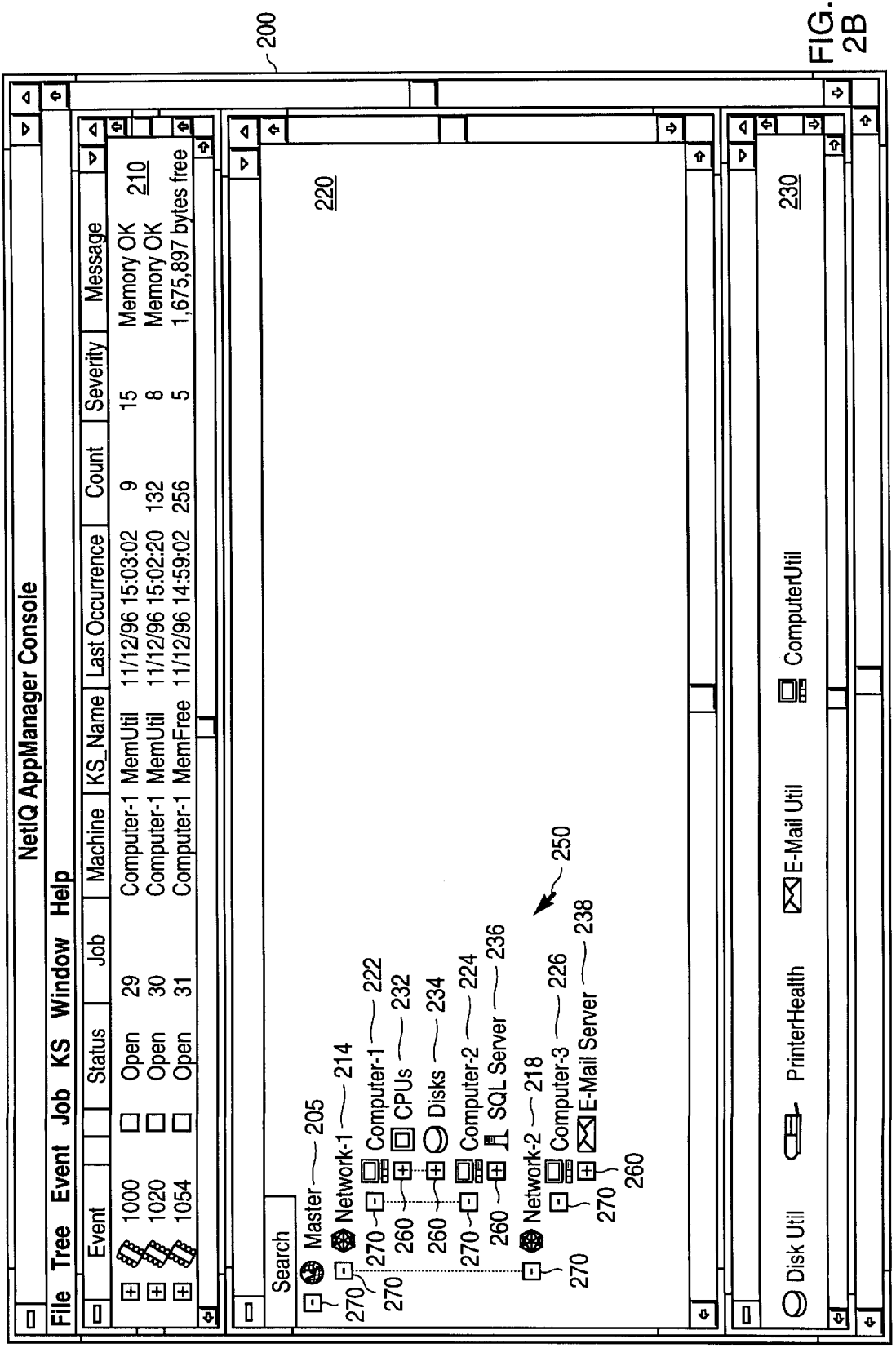
FIG. 2B shows the foldable object tree of FIG. 2A after all the leaves of the tree have been folded.

Note that in FIG. 2B fold indicator 260 and unfold indicator 270 are used to indicate which nodes are folded and which nodes are unfolded. Any suitable technique known in the art may be used to indicate whether a parent object has a subtree folded underneath such as displaying a "+" sign in front of a resource object icon in the object tree if there is a subtree folded underneath, or a "–" sign in front of an object when the subtree underneath is unfolded. Alternatively, one icon can be used for the object (e.g. a closed folder shape) when the subtree underneath is folded, and another icon (e.g. an opened folder shape) can be used for the object when the subtree underneath is unfolded.

The object tree may be folded by clicking on the "–" sign in front of a node of the tree as shown in FIG. 29. FIG. 2B illustrates the object tree of FIG. 2A after CPU-0 icon 241 has been folded under CPUs icon 232 by dragging cursor icon 250 over the "–" sign in front of CPUs icon 232 and pressing the mouse button (not shown). Similarly, C: icon 242 and D: icon 244 are folded under disks icon 234, DB-1 icon 246 is folded under SQL server icon 236 and user-1 mailbox icon 248 and user-2 mailbox icon 249 are folded under e-mail server icon 238.

Figure 2C:
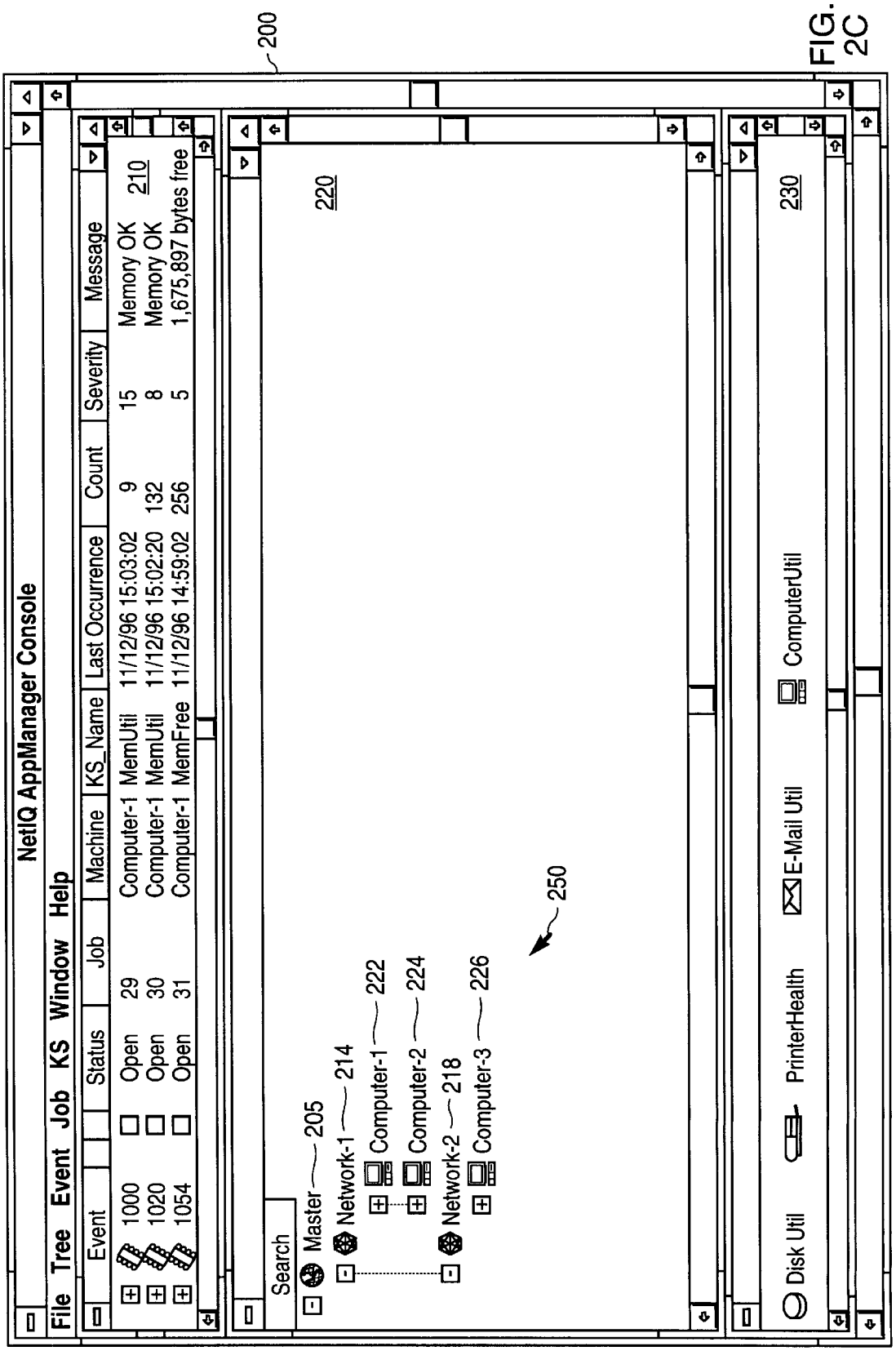
FIG. 2C shows the foldable object tree of FIG. 2B after all the leaves of the tree have been folded.
Figure 2D:
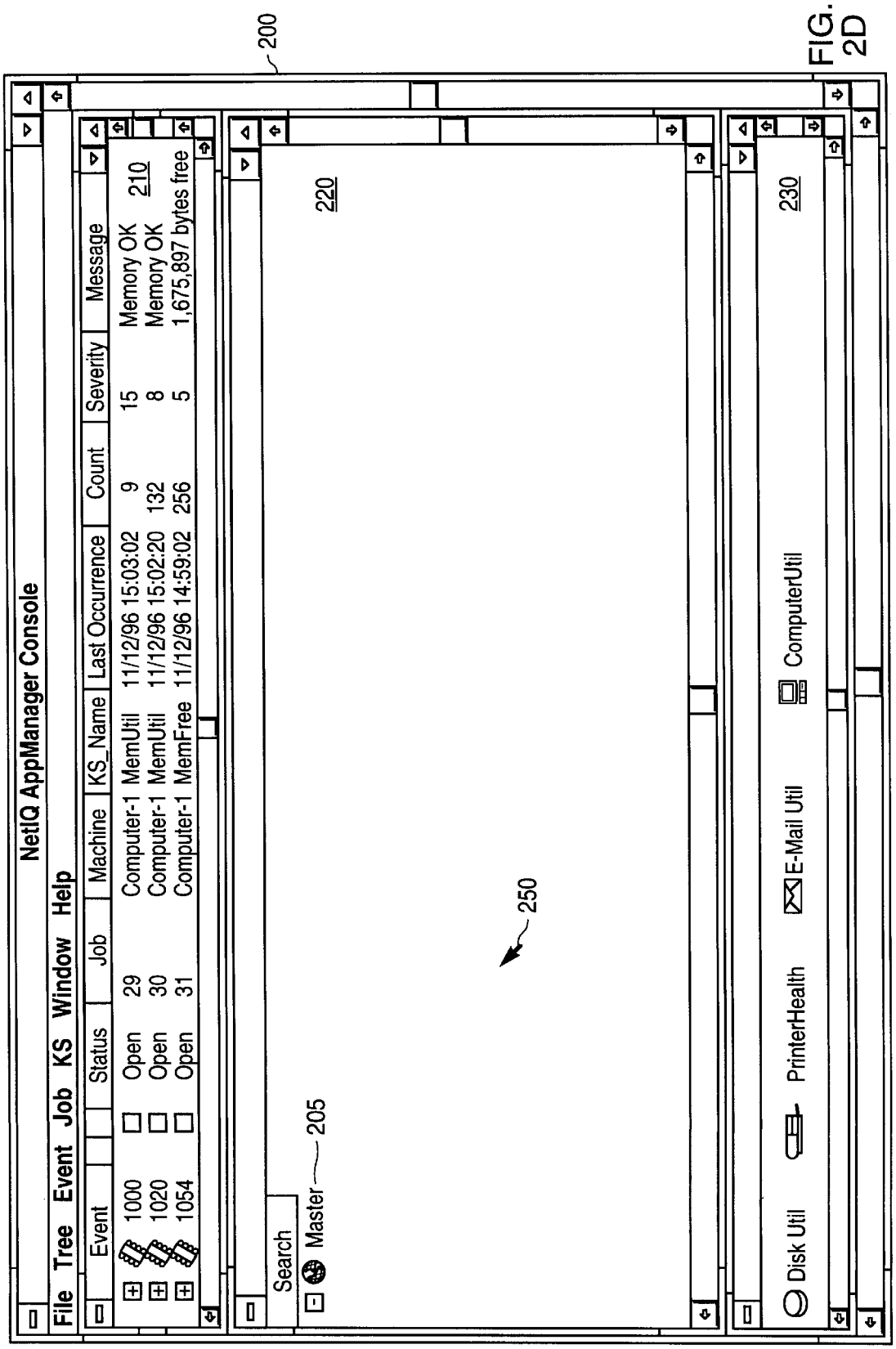
FIG. 2D shows the foldable object tree of FIG. 2C after the tree has been folded into the root node.

The object tree can be further folded, as shown in FIG. 2C, until only the entire tree is folded under the root, as shown in FIG. 2D.

When an event occurs on a resource object that is included in the object tree, the event is visually indicated to the user by modifying a visual display the corresponding resource object icon. Any suitable technique known in the art may be used to modify the visual display of the resource object icon, such as displaying the icon intermittently to produce a blinking effect or changing the color of the icon. As in a foldable object tree the resource object icon corresponding to the resource object may be folded under a parent object icon, an event indicator is displayed on the icons of all the parent objects of the resource object, including the root of the tree. This ensures that regardless of how many levels of objects in the tree are folded, the event indicator is always visible. These operations are illustrated in FIGS. 3A–3D.

Figure 3A:
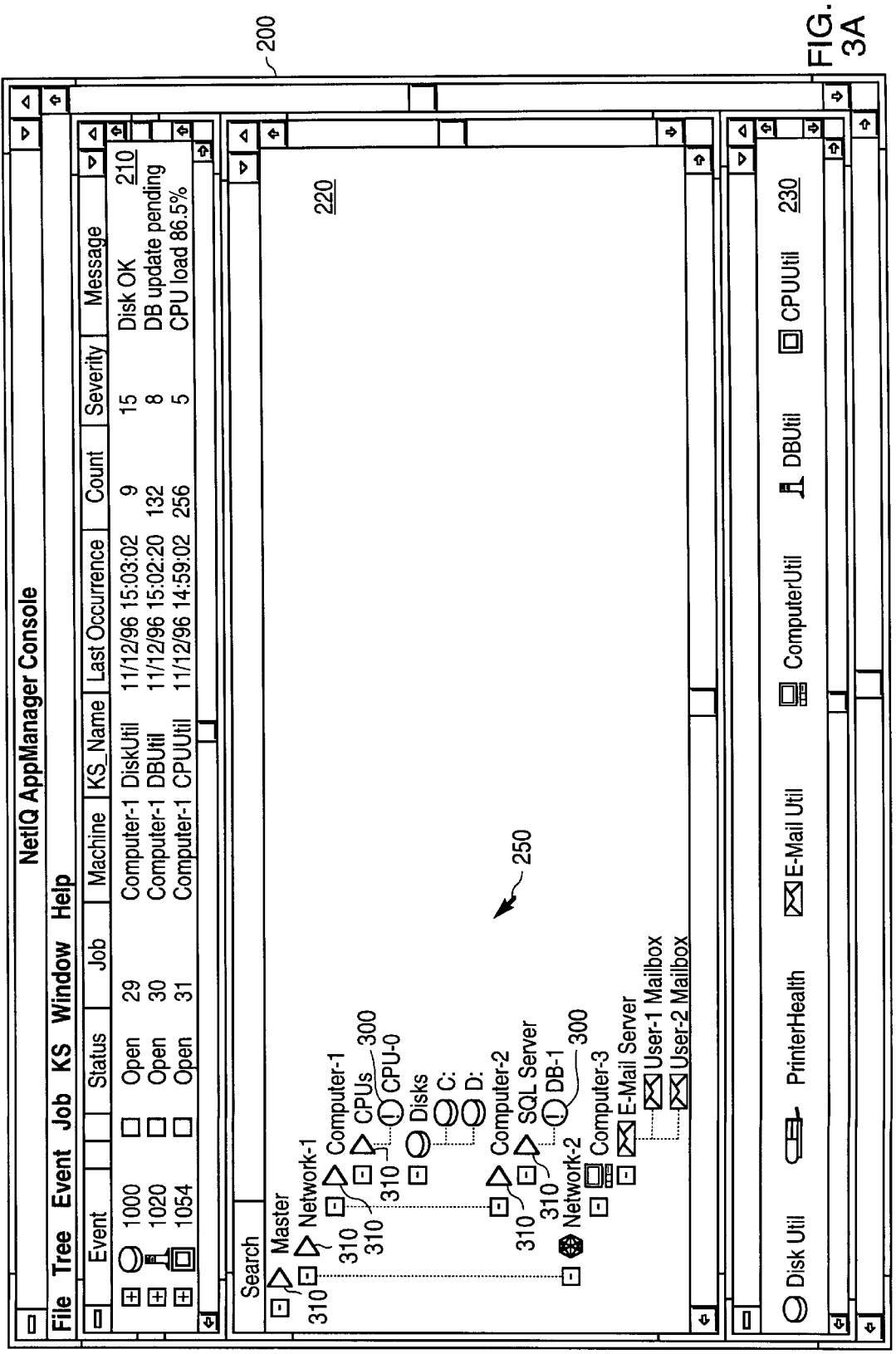
FIG. 3A shows a foldable object tree displayed by the GUI of a computer system during an event signaling operation, according to one embodiment of the invention.

FIG. 3A illustrates the object tree of FIG. 2A after the occurrence of two events on the resource objects corresponding to CPU-0 icon 241 and DB-1 icon 246, respectively. To indicate the occurrence of the events, CPU-0 icon 241 and DB-1 icon 246 are replaced by event indicator 300. In addition, to indicate that an event has occurred on a child object, master icon 205, network-1 icon 214, computer-1 icon 222, computer-2 icon 224, CPUs icon 232 and SQL server icon 236 are replaced by event-on-child indicator 310.

Figure 3B:
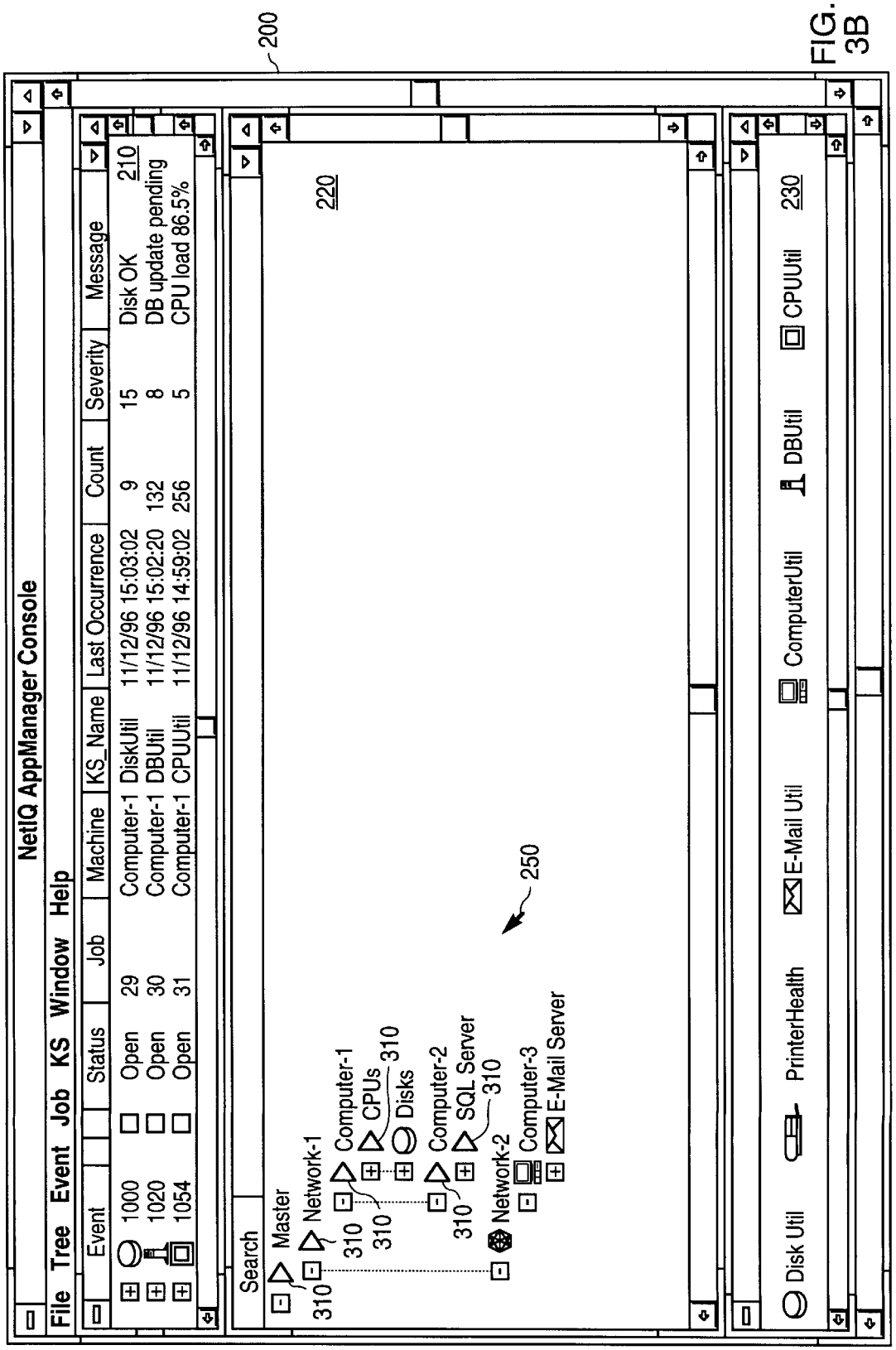
FIG. 3B shows the foldable object tree of FIG. 3A after all leaves of the tree have been folded.
Figure 3C:
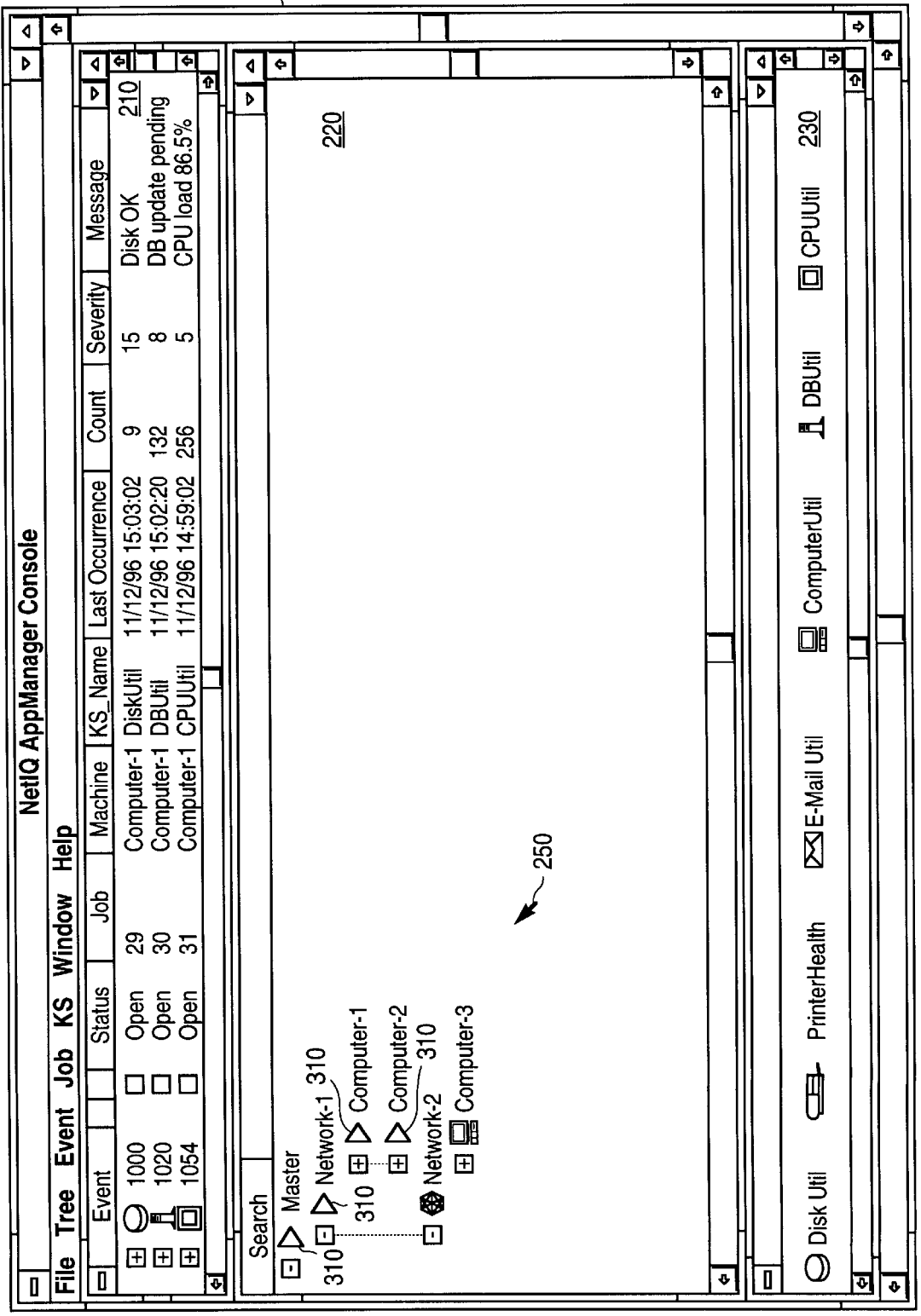
FIG. 3C shows the foldable object tree of FIG. 3B after all leaves of the tree have been folded.
Figure 3D:
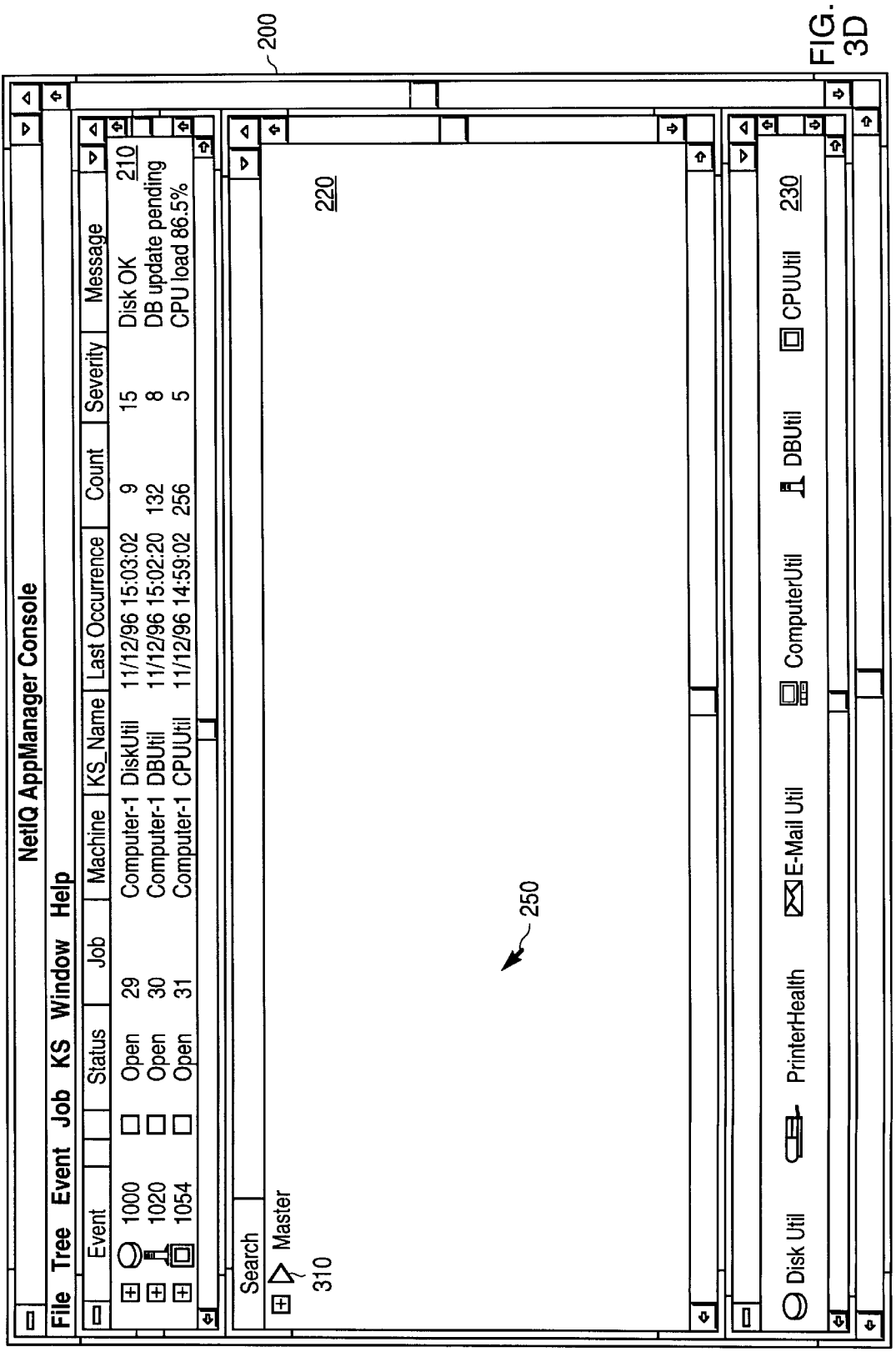
FIG. 3D shows the foldable object tree of FIG. 3C after the tree has been folded into the root node.

Thus, if the leaves of the object tree of FIG. 3A are folded, as shown in FIG. 3B, event-on-child indicators 310 are still visible to indicate the occurrence of the events. Similarly, if the object tree of FIG. 3B is further folded, as shown in FIG. 3C, or the entire tree is folded under the root, as shown in FIG. 3D, at least one event-on-child indicator 310 is still visible to indicate the occurrence of the events.

In one embodiment of the invention, a method is further provided to allow a user to display a portion of a folded tree which contains an event indicator 300, as shown in FIG. 4. FIG. 4 illustrates the object tree of FIG. 3D in which the user has dragged cursor icon 250 over master icon 205 (which has been temporarily replaced by event-on-child indicator 310) and pressed an input combination such as clicking on the icon while pressing the Shift key on the keyboard. In response to the user input combination, the portion of the object tree under the master icon node is temporarily unfolded to reveal all those portions of the tree containing hidden event-indicators 300 and event-on-child indicators 310. Alternatively, once the subtree is unfolded, clicking again while holding down the Shift key will cause the subtree to be folded back into the object tree of FIG. 3D.

When a user acknowledges an event associated with an object, the visual indicator on the object's icon and on all of its parent icons in the object tree are removed to provide a visual confirmation of the acknowledgment operation.

When multiple events occur on different resource objects having a common parent object, the common parent object icon is replaced by an event-on-child indicator that accounts for all the events occurring on the child resource objects. The visual indicator on the common parent icon, therefore, can only be removed after all the events occurring on the child objects have been acknowledged. These operations are illustrated in FIGS. 5A–5B.

Figure 5A:
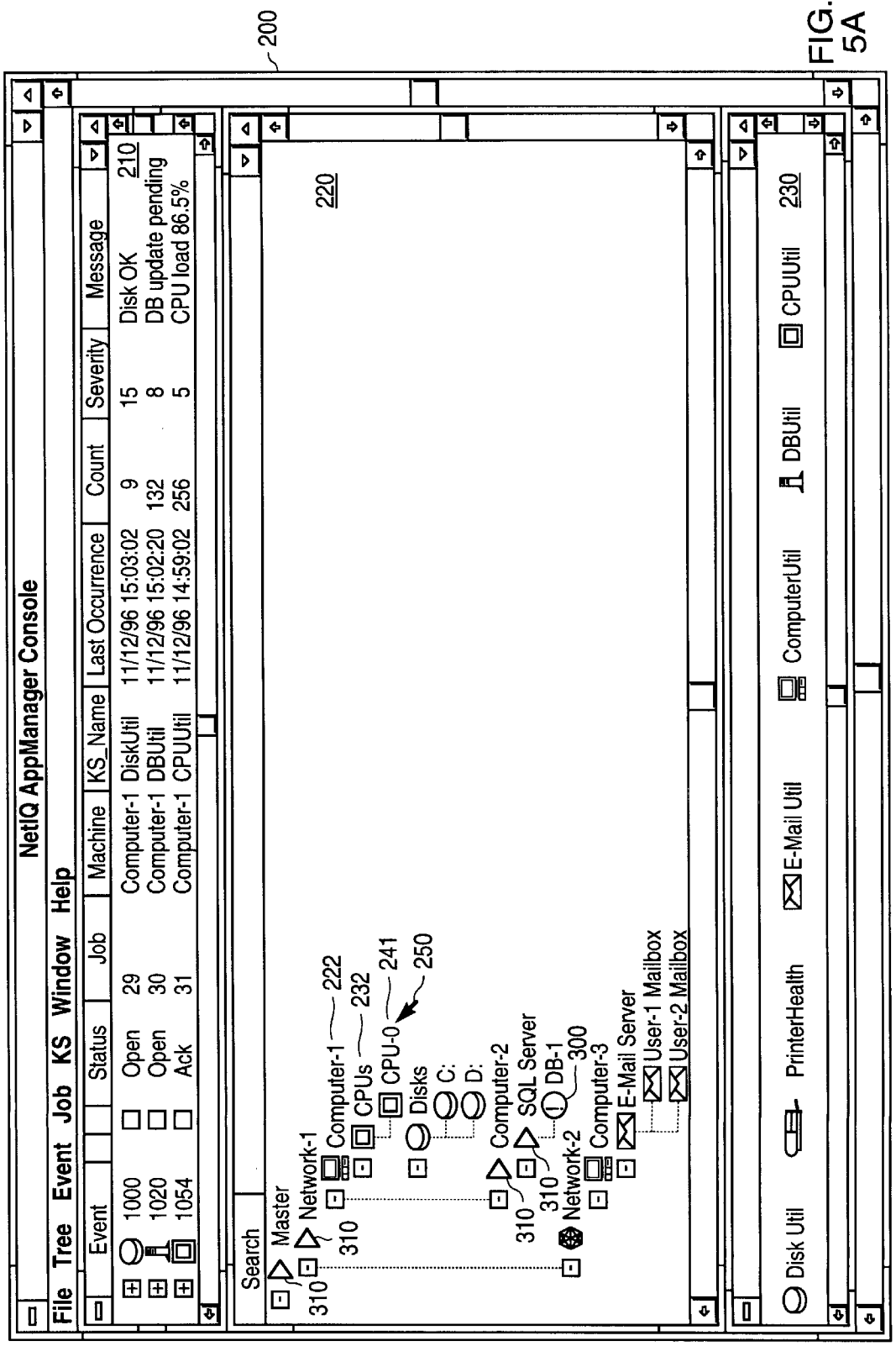
FIG. 5A shows the foldable object tree of FIG. 3A after an event has been acknowledged by clicking on a resource object icon.
Figure 5B:
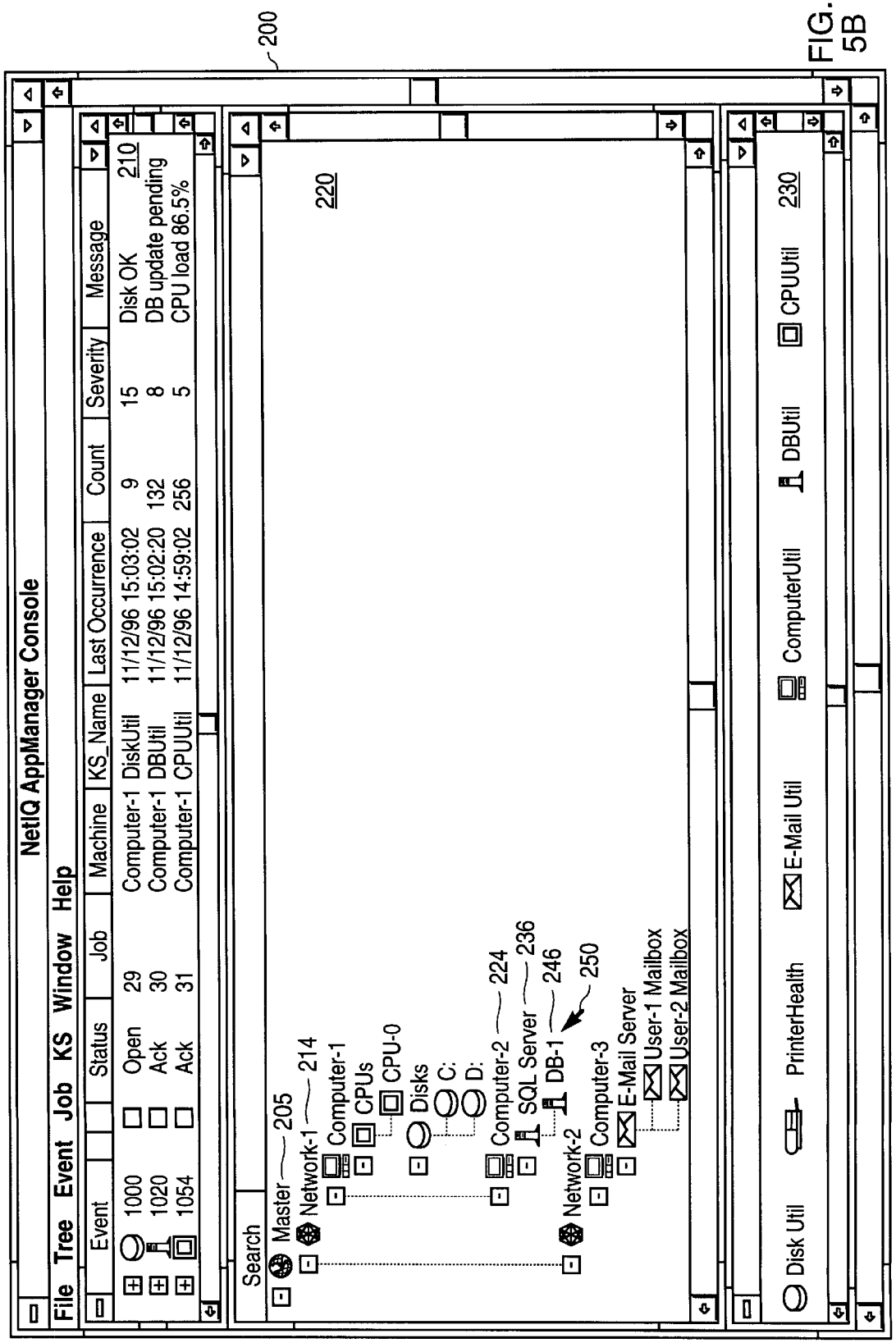
FIG. 5B shows the foldable object tree of FIG. 3A after another event has been acknowledged by clicking on a different resource object icon.

FIG. 5A shows the object tree of FIG. 3A after the event occurring on the resource object corresponding to CPU-0 icon 241 has been acknowledged by clicking on CPU-0 icon 241. As a result of the acknowledgment, event indicator 300 is removed from CPU-0 icon 241 and event-on child indicators 310 are removed from CPUs icon 232 and computer-1 icon 222. Note, however, that event-on-child indicators 310 are not removed from network-1 icon 214 and master icon 205 since the resource objects corresponding to those icons still have a child resource object on which an event has occurred and has not been acknowledged (i.e., the event occurring on the resource object corresponding to DB-1 icon 246). When the event occurring on the resource object corresponding to DB-1 icon 246 is acknowledged by clicking on DB-1 icon 246, the remaining event-indicator 300 and event-on-child indicators 310 are removed from the object tree, as shown in FIG. 5B.

Any suitable technique known in the art may be used to acknowledge the occurrence of the event. One such technique is clicking on an icon corresponding to the resource object on which the event has occurred, as shown in FIGS. 5A–5B. Alternatively, a list of events, such as list pane 210, may be displayed in the window that shows the list of unacknowledged events. A user can acknowledge the event simply by clicking on the list item representing the event.

Figure 6A:
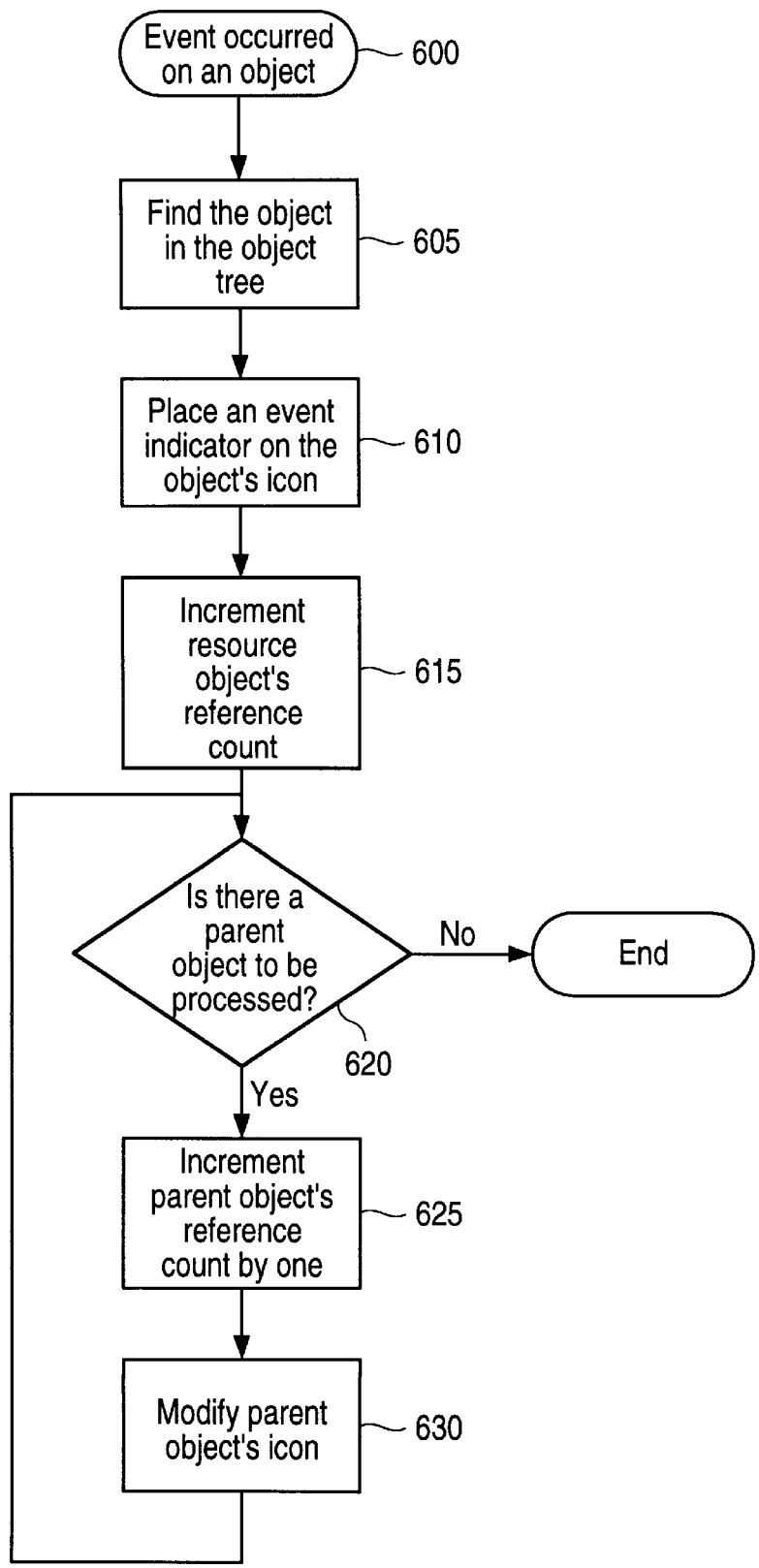
FIG. 6A is a flow diagram of an event signaling operation, according to one embodiment of the invention.
Figure 6B:
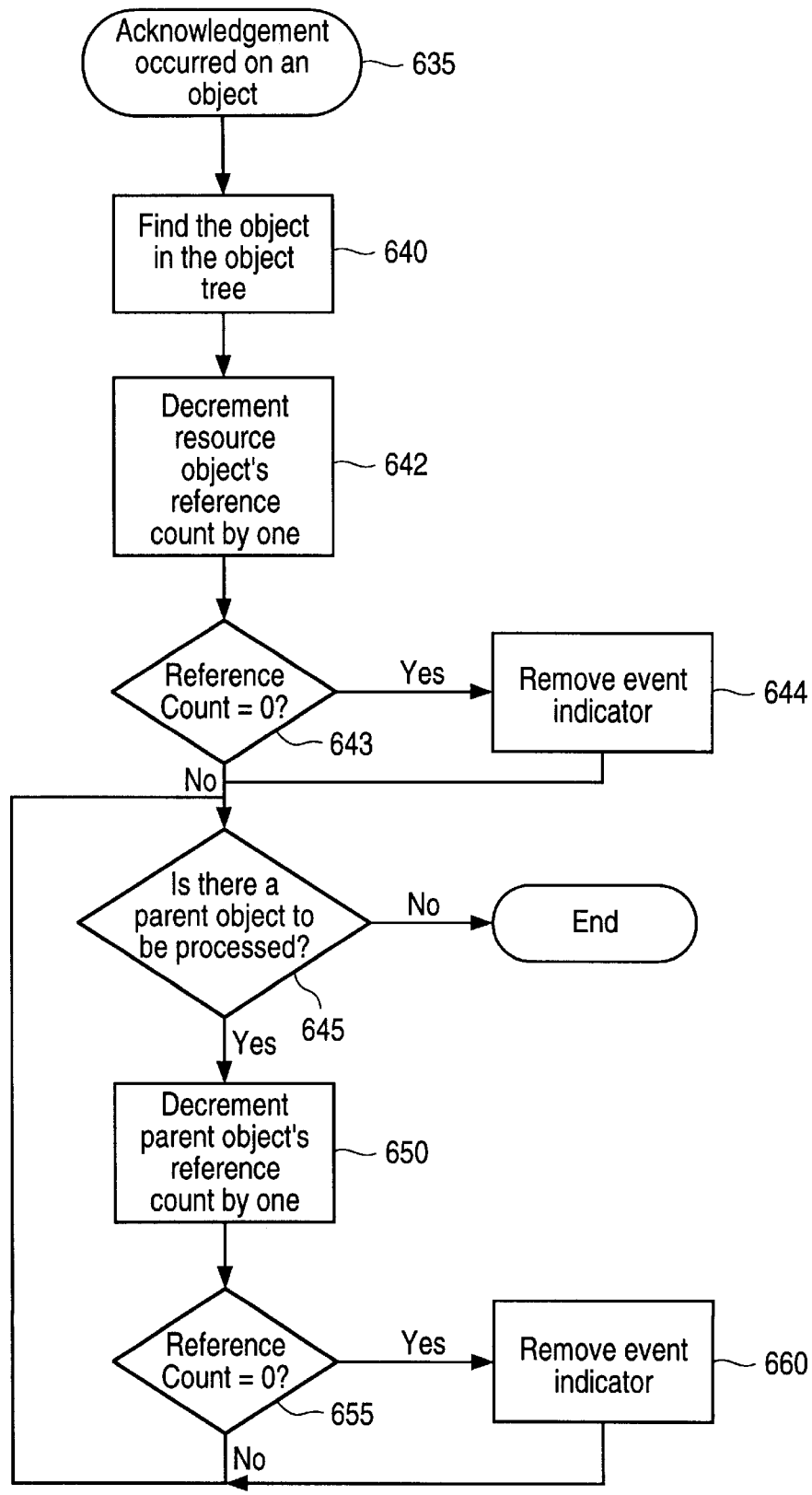
FIG. 6B is a flow diagram of an event acknowledgment operation, according to one embodiment of the invention.
Figure 6C:
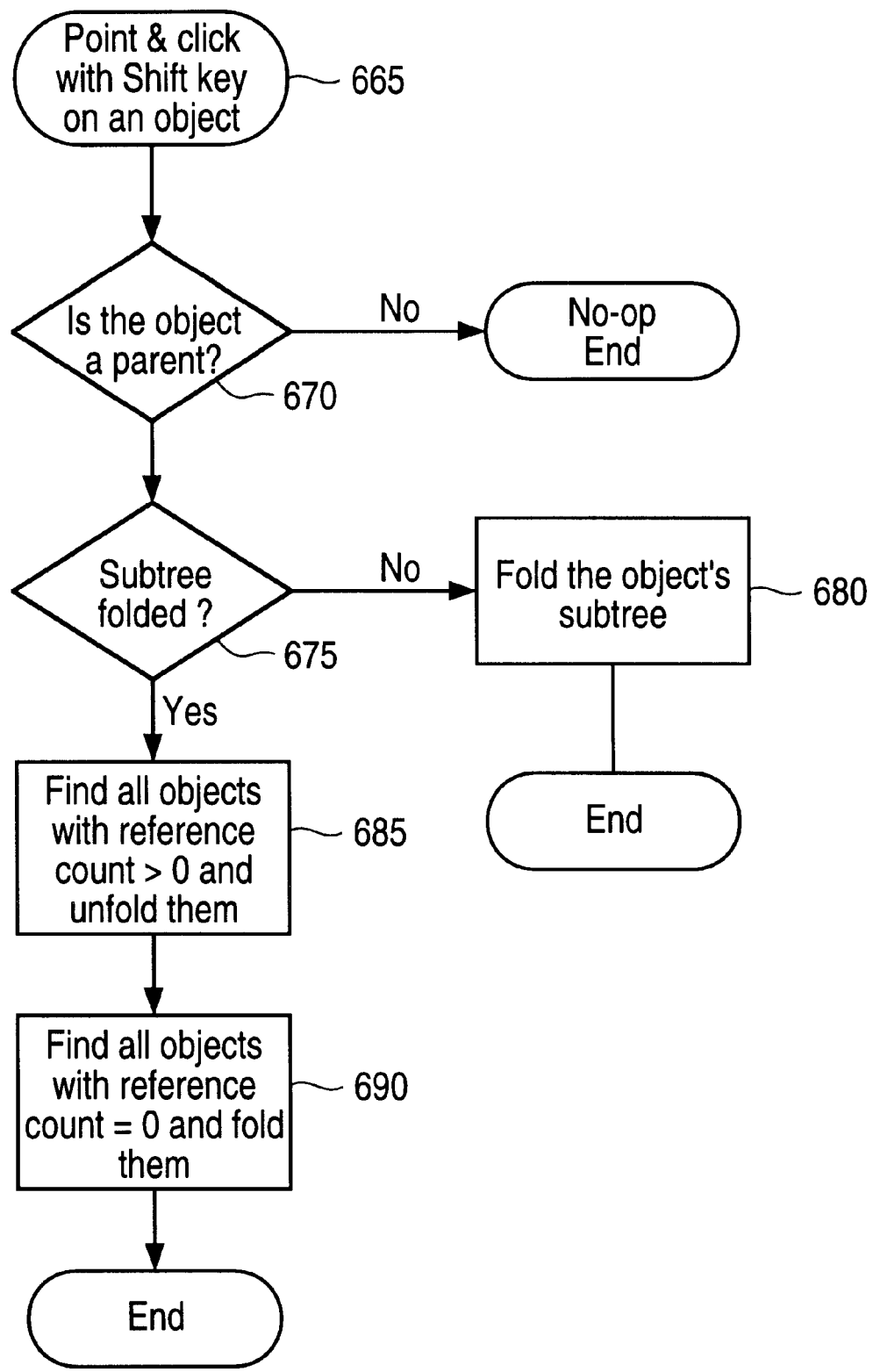
FIG. 6C is a flow diagram of a temporary unfolding operation, according to one embodiment of the invention.
Figure 7:
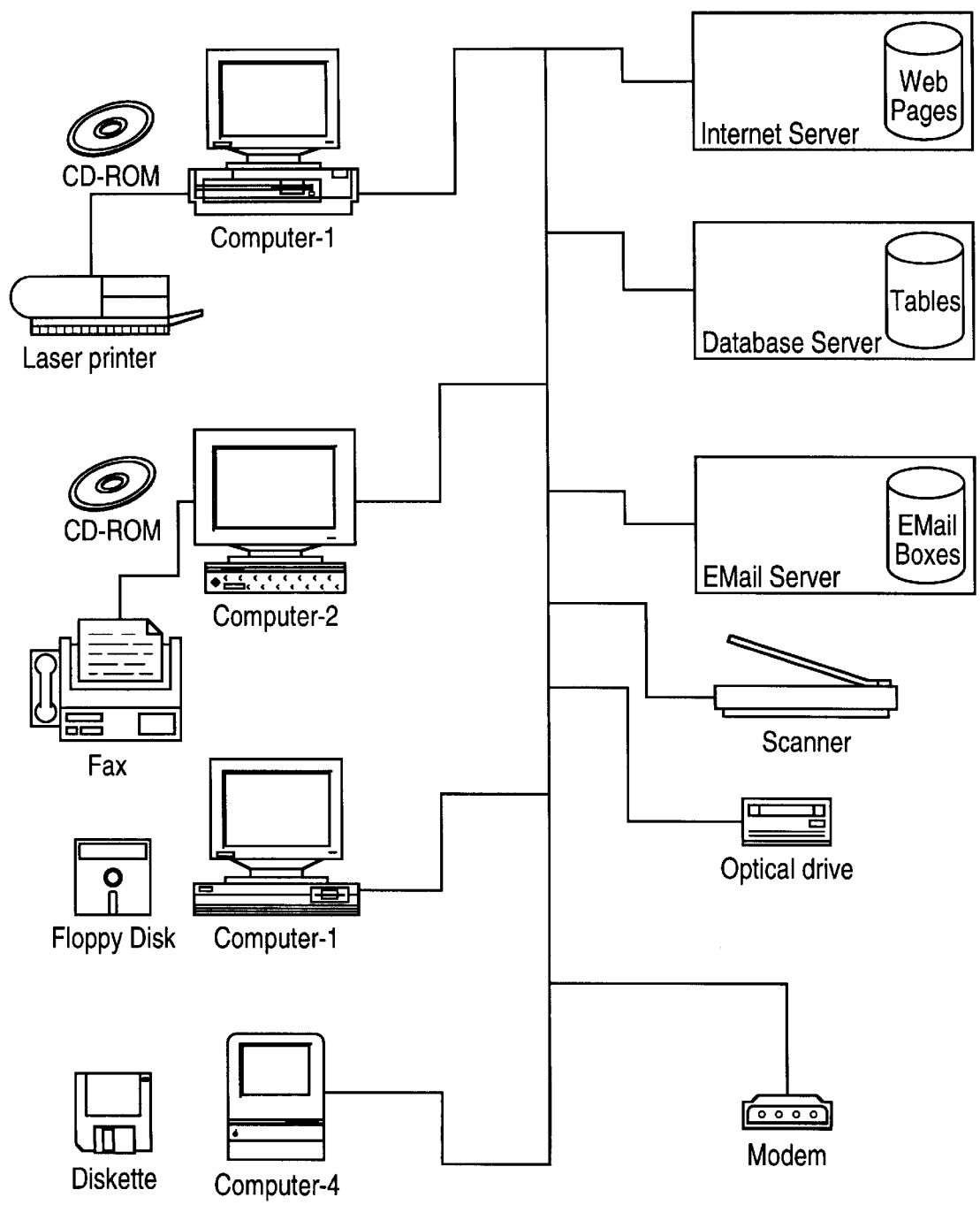
FIG. 7 shows a distributed system in accordance with one embodiment of the invention.

The operations of FIGS. 3A–5B are more formally described by the flow diagrams of FIGS. 6A–6C.

FIG. 6A illustrates the operation of signaling the occurrence of an event on a resource object represented by an icon in the object tree, as shown in FIGS. 3A–3D. When an event occurs on a resource object in stage 600, first the object is located in the object tree in stage 605. An event indicator is then placed on the icon corresponding to the resource object in stage 610. A reference count for the resource object is then incremented in stage 615. Stage 620 then determines whether there are any unprocessed parent objects of the resource object on which the event has occurred, in which case a reference count maintained on the parent is incremented by one in stage 625, otherwise the operation terminates. The reference count indicates the number of events that have occurred on child objects of the parent object. While only one indicator is displayed for a parent object, the indicator is not removed during an acknowledgment operation unless the reference count has reached zero, as explained below. Finally, the parent object icon is modified to indicate that at least one event has occurred on a child object of the parent object in stage 630 and stage 620 is repeated. Once all parent objects have been processed, the test of stage 620 fails and the operation terminates.

FIG. 6B illustrates the operation of acknowledging an event on a resource object represented by an icon in the object tree, as shown FIGS. 5A–5B. When an acknowledgment occurs on a resource object (e.g. by clicking on an event indicator) in stage 635, the resource object is first located in the object tree in stage 640. A reference count for the object is then decremented in stage 642. Stage 643 determines whether the reference count is equal to zero, in which case the event indicator is removed in stage 644, otherwise the operation proceeds to stage 645. Stage 645 determines whether there are any unprocessed parent objects of the resource object on which the event has occurred, in which case the reference count of the parent object is decremented by one in stage 650, otherwise the operation terminates. Finally, stage 655 determines whether the reference count is equal to zero, in which case the event indicator is removed in stage 660, and stage 645 is repeated. Once all parent objects have been processed, the test of stage 645 fails and the operation terminates.

FIG. 6C illustrates the operation of temporarily folding/unfolding a portion of the object tree on which event indicators are displayed, as shown in FIG. 4. When a user clicks on an icon at a node of the object tree while holding down the Shift key in stage 665, stage 670 determines whether the resource object corresponding to the icon the user clicked on is a parent resource object, in which case the operation proceeds with stage 675, otherwise the operation terminates. In other words, if the user attempts to perform this operation on a leaf of the tree, no folding/unfolding is necessary. Stage 675 then determines whether the subtree at the node on which the user has clicked is folded. If the subtree is unfolded, the subtree is folded in stage 680 and the operation terminates, otherwise all child objects of the resource object selected by the user which have a reference count greater than zero are unfolded in stage 685, all child objects with reference count equal to zero are folded in stage 690 and the operation terminates.

In one embodiment, different levels of severity for the events are represented by displaying the icons in different colors according to the severity levels. One reference count for each severity level for each resource object is needed to support this operation. For each event occurrence, the event's severity level determines which reference count should be incremented; likewise for each event acknowledgment, the event's severity determines which event count decremented. When more than one reference count is greater than zero, the one with a higher severity level takes precedence and is used to show the event indicator and color of the resource object icon.

Further, in one embodiment, the reference count is used to control the blinking frequency. For example a higher blinking frequency is used to indicate multiple event occurrences at the object's icon, while a lower frequency is used to indicate a single event. An alternative would be to use a number of fast blinkings to indicate the number of events followed by a longer blinking as a spacing, followed again by a number of fast blinkings.

The method of the preferred embodiment of the invention can be used as part of a system management system. A system management system is a system which allows an operator, or even a lay user, to monitor and maintain a computer system. For example, a management system allows the operator to check the amount of disk space available on the disk drives connected to the system and take appropriate action when the amount of disk space is limited (e.g. send a message to the users to delete unnecessary files, or launching a program designed specifically to correct the problem). The system also monitors the various subsystems such as database servers, e-mail servers, network servers, etc. and keeps statistics of the performance of each of the subsystems.

Figure 8:
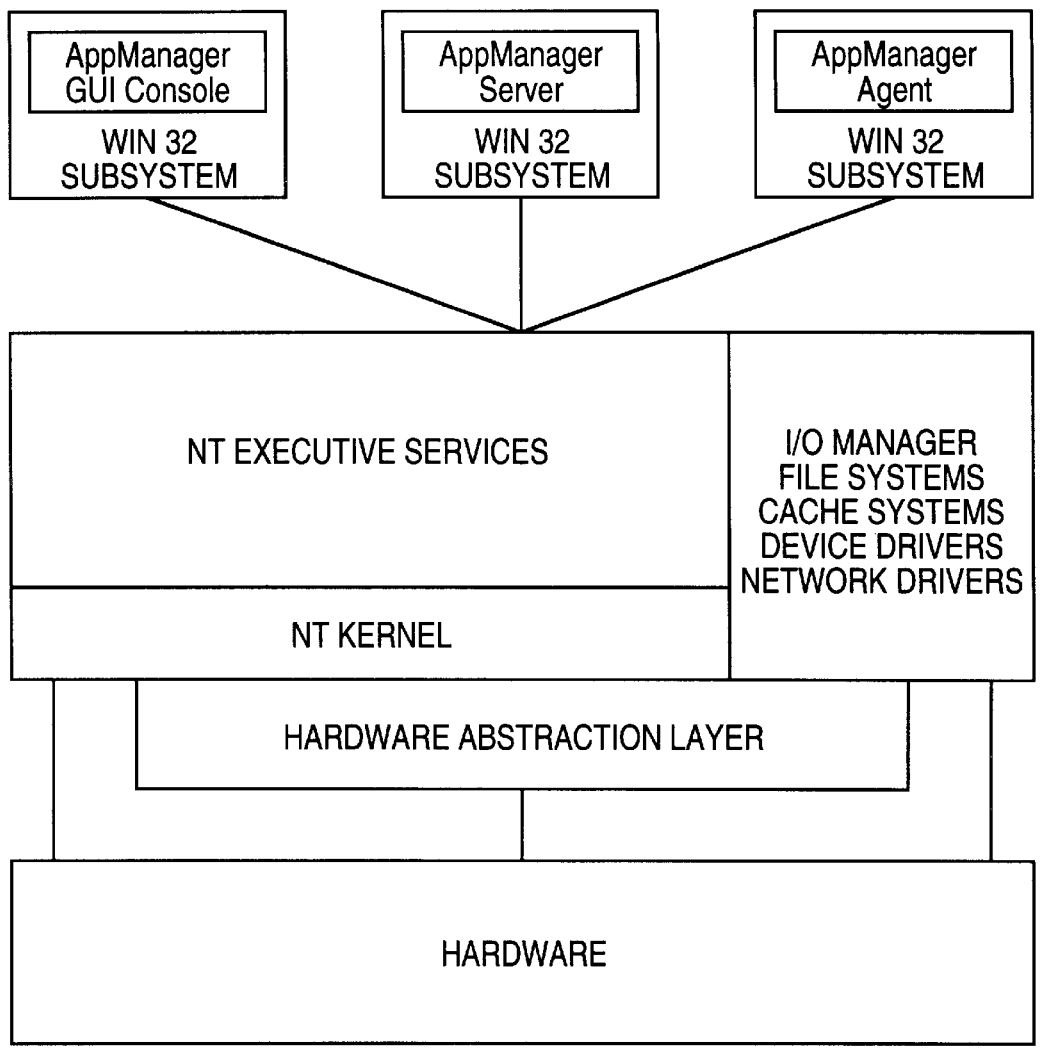
FIG. 8 is a block diagram of an operating system according to one embodiment of the invention.

A system management system according to the preferred embodiment of the invention can be implemented as an application program on a distributed system running under the Windows NT® operating system, as shown in FIG. 8. For example, such a system management system allows the operator to manage computer resources, database servers, e-mail servers, internet servers, etc. distributed on multiple machines running the Windows NT® operating system. FIG. 8 illustrates the structure of the Windows NT® operating system. AppManager™, a system management system which embodies the principles of the preferred embodiment of the invention, is implemented as three types of application programs, AppManager™ GUI Console, AppManager™ Server and AppManager™ Agent running under the Win32 subsystem of the Windows NT® operating. The AppManager™ GUI Console is a program that runs on the system administrator console and allows the system administrator to centrally define and control the execution of all programs. The AppManager™ Server is a program that runs on a Windows NT® server that manages the communications between the AppManager™ GUI and the AppManager™ Agents. The AppManager™ Agents are application programs that run on any Windows NT® server or workstation that receive request from the AppManager™ GUI Console to run programs. All AppManager™ products are available from NetIQ, Corp. of Santa Clara, Calif.

Embodiments described above illustrate but do not limit the invention. In particular, the invention is not limited by any particular icons used to indicate that an event has occurred on a resource object. Further, different computer hardware may be utilized. For example, instead of using a mouse for drag and drop operations, a keyboard, a trackball, or any other suitable device may be used to control the cursor. Other embodiments and variations are within the scope of the invention, as defined by the following claims.

We claim:

1. A method for indicating the occurrence of an event on a resource object of a computer system, the method comprising:

determining that an event has occurred on a resource object of the computer system;

modifying a visual display of a resource object icon corresponding to the resource object to indicate that the event has occurred on the resource object, wherein the resource object icon is one of a plurality of icons displayed by the graphical user interface of the computer system, wherein the plurality of icons is arranged in a tree topology;

one of the plurality of icons represents a root of the tree;

a remainder of the plurality of icons represent nodes of the tree;

a first icon is a parent object icon of a second icon only if a path connecting the second icon to the root of the tree includes the first icon;

a second icon is a child object icon of the first icon only if the first icon is a parent of the second icon;

for each parent object icon of the resource object icon, modifying a visual display of the parent object icon to indicate that the event has occurred on the resource object;

detecting that the user has acknowledged the occurrence of the event on the resource object by the user entering an input;

modifying the visual display of the resource object icon to indicate that the event has been acknowledged by the user; and for each parent object icon of the resource object icon, modifying a visual display of the parent object icon to indicate that the event has been acknowledged by the user, only if the parent object icon has no other child object icon on which an event has occurred and has not been acknowledged.

2. The method of claim 1, wherein the visual display of the resource object icon is modified only if the visual display of the resource object icon has not been previously modified to indicate that an event has occurred on the resource object, and the visual display of the parent object icon is modified only if the visual display of the parent object icon has not been previously modified to indicate that an event has occurred on a resource object.

3. The method of claim 1, wherein a portion of the icons arranged in the tree topology is replaced by a single icon by clicking on the single icon, wherein the single icon is either the root of the tree or the icon in the replaced portion of the tree that is closest to the root of the tree and the visual display of the resource object icon and/or of any parent resource object icons is modified only if the resource object icon and/or the parent resource object icons are not hidden.

4. The method of claim 3, wherein the single icon is replaced by the portions of the icons arranged in the tree topology by clicking on the single icon.

5. The method of claim 1, wherein the event has a severity level and the visual display of the resource object icon is modified according to the severity level.

6. The method of claim 1, wherein the plurality of icons are arranged in a topology other than a tree.

7. The method of claim 6, wherein the plurality of icons are arranged in a list topology.

8. The method of claim 6, wherein the plurality of icons are arranged in a star topology.

9. The method of claim 6, wherein the plurality of icons are arranged in a network topology.

10. The method of claim 1, wherein the method is embodied in a computer program that is part of a system management system.

11. The method of claim 10, wherein the system management system is executed on a distributed computer system.

12. The method of claim 1, further comprising detecting that the user has acknowledged the occurrence of the event on the resource object by clicking on the resource object icon.

13. A computer-readable storage medium storing software executable by a computer system, the software including instructions for:

determining that an event has occurred on a resource object of the computer system;

modifying a visual display of a resource object icon corresponding to the resource object to indicate that the event has occurred on the resource object, wherein the resource object icon is one of a plurality of icons displayed by the graphical user interface of the computer system, wherein the plurality of icons is arranged in a tree topology;

one of the plurality of icons represents a root of the tree;

a remainder of the plurality of icons represent nodes of the tree;

a first icon is a parent object icon of a second icon only if a path connecting the second icon to the root of the tree includes the first icon;

a second icon is a child object icon of the first icon only if the first icon is a parent of the second icon;

for each parent object icon of the resource object icon, modifying a visual display of the parent object icon to indicate that the event has occurred on the resource object;

detecting that a user has acknowledged the occurrence of the event on the resource object by the user entering an input;

modifying the visual display of the resource object icon to indicate that the event has been acknowledged by the user; and for each parent object icon of the resource object icon, modifying a visual display of the parent object icon to indicate that the event has been acknowledged by the user, only if the parent object icon has no other child object icon on which an event has occurred and has not been acknowledged.

14. The computer-readable storage medium of claim 13, wherein the program is part of a system management system.

15. The computer-readable storage medium of claim 14, wherein the system management system is executed on a distributed computer system.

16. The computer-readable storage medium of claim 13, wherein the software further comprises instructions for detecting that the user has acknowledged the occurrence of the event on the resource object by clicking on the resource object icon.

* * * * *